Patented Apr. 13, 1943

2,316,418

UNITED STATES PATENT OFFICE 2,316,418

COMPOSITION COMPRISING SOLID ETHYLENE POLYMERS

Bernard James Habgood, Blackley, Manchester, England, assignor to Imperial Chemical Industries Limited, a corporation of Great Britain No Drawing. Application May 27, 1940, Serial No. 337,550. In Great Britain May 30, 1939

2 Claims. (Cl. 260—41)

This invention relates to new compositions comprising solid ethylene polymers and to methods for the manufacture of said compositions.

In the term "solid ethylene polymers," used herein I include solid ethylene polymers obtained by subjecting ethylene, with or without a small content of oxygen, to a very high pressure which is above 500 atmospheres, and to a moderately high temperature, e. g., 100° to 400° C., as described, for example, in Patent 2,153,553. Also in the term solid ethylene polymer I include solid halogenated derivatives of the ethylene polymer obtained, for example, as described in Patent 2,183,556, application Serial No. 290,072 filed August 14, 1939, and application Serial No. 194,983 filed March 9, 1938, as well as interpolymers of ethylene with one or more other polymerisable organic substances obtained, for example, as described in Patent 2,200,429.

The solid ethylene polymers are waxy in feel like paraffin wax having a molecular weight ranging from 2000 upwards and a melting or softening point of about 90–120° C. The ethylene polymers have outstandingly good dielectric properties and remarkably low electrical conductivities. The solid ethylene polymers can be converted into flexible and elastic shapes by known methods, for example by extruding or drawing at elevated temperatures or by cold drawing into rods, tubes or threads, or by hot or cold rolling into films and like shapes, or by moulding or casting into any desired shape. They correspond in composition substantially to $(CH_2)_x$ and by X-ray examination show a crystalline structure. The properties of flexibility, and elasticity and high resistance to water or chemical reagents possessed by shaped articles obtained from these solid ethylene polymers render these polymers useful for the manufacture of pipes, valves and the like for chemical plant, or as protective coverings for use in chemical plant. The outstanding electrical properties and excellent mechanical properties possessed by these polymers make them very suitable for use as dielectrics in the electrical industry and particularly suitable for use as dielectrics in high frequency or low frequency power cables.

I have now found that, when particular carbon blacks as hereinafter defined are incorporated in certain proportions with solid ethylene polymers, in addition to the excellent properties conferred on the new compositions by the presence of the solid ethylene polymers therein, the compositions become endowed with new and valuable properties, for example, they have increased hardness, increased tensile strength and very appreciably increased electrical conductivities.

The properties of flexibility, elasticity, high resistance to water or chemical reagents, hardness and great tensile strength possessed by the new compositions render them particularly suitable for the manufacture of pipes, valves and the like for chemical plant or for use as protective coverings in plant which is to be in contact with corrosive liquids, or gases. Furthermore, the increased electrical conductivity imparted to the ethylene polymers by incorporation with carbon blacks is an added advantage when the new compositions are used for the purposes mentioned above, as fire-hazards, due to the development of static electrical charges, are very greatly minimised.

The electrical conductivities possessed by the new compositions find application in the manufacture of cables. For example, in single core telegraphic or telephonic cables a conductive sheath made from one of the new compositions may be used to provide the earth return in circuits employing these cables. At test points in high tension power cables, that is, at places at which the circuit may have to be interrupted, in order to avoid a corona discharge between the conductor and the earthed protective metal sheath when the circuit is interrupted, it is an advantage to use a graded dielectric, that is a dielectric to which there has been added an increasing amount of a more highly electrical conductive material, so that at the actual point at which the current is to be interrupted the dielectric has a much greater electrical conductivity than that possessed by the dielectric used in the remainder of the cable; the compositions of this invention are useful for this purpose.

The carbon blacks suitable for use in this invention are acetylene blacks, channel blacks, and the light lamp blacks such as have a particle size not exceeding 100 millimicrons.

It may be noted that the activity of carbon blacks in rubber compounding and for such purposes as the present runs at least approximately parallel with their particle size. Some authorities consider that particle size is only an approximate guide and that the ratio of volume to surface area of the particle is a truer guide to activity. The above mentioned carbon blacks are all of small particle size. Thus channel blacks have particles of the order of 40–60 millimicrons in diameter and the lighter lamp blacks may vary from 80 to 120 millimicrons. Heavy lamp blacks are of the order of 1500 millimicrons. Acetylene blacks which, for the purposes of the present invention are more active than light lamp blacks, are a little anomalous when judged on particle size alone. Thus the figure given for such blacks by Stapelfeldt in Kautschuk, 1936 vol. 12 p. 175 is about 130 millimicrons but it should be noted that their particles are needle-shaped or rod-like, so that even though their greatest diameter may be larger than the figure given for light lamp blacks, their ratio of volume to surface area may be comparable with that for channel blacks or light lamp blacks.

According to the invention I provide a process, whereby compositions with new and valuable properties are manufactured, which comprises milling together at an elevated temperature 100 parts by weight of one or more solid ethylene polymers as hereinbefore defined and 25 to 60 parts by weight of one or more carbon blacks as hereinbefore defined, if desired in the presence of a volatile organic solvent, which may be subsequently removed by volatilisation. The invention also comprises the so-obtained compositions.

In carrying the invention into practical effect the solid ethylene polymer or mixture of solid ethylene polymers is heated to its softening or melting point on a heated two-roll rubber mill or in an internal mixer and there is added the desired carbon black or a mixture of carbon blacks. The ingredients are then milled until a homogeneous mix is obtained whereupon the new composition is removed from the mill and cooled or allowed to cool. If desired it may be converted into any required shape before cooling. Alternatively, the solid ethylene polymer or mixture of polymers, the desired carbon black or mixture of carbon blacks and a proportion of a volatile organic solvent, preferably a sufficiency of volatile organic solvent to dissolve the polymer or mixture of polymers at the temperature being used, are milled together in a ball-mill at an elevated temperature until the mix is homogeneous. The so-obtained composition may be used as such or, preferably, before use, the volatile organic solvent is removed by volatilisation.

As indicated above, the preferred compositions contain a proportion of carbon black of at least 25% by weight on the weight of the polymers. Much higher proportions of carbon blacks may be used, for example, proportions up to 60% by weight on the weight of the polymers. If proportions greater than 60% of a highly active carbon black, for example, that known in the trade as Kosmos F4, are used, the compositions become undesirably brittle.

As indicated above, the carbon blacks suitable for the purposes of this invention are channel blacks, such as are made by incompletely combusting a natural gas, allowing the products of combustion to impinge upon cooled metal channels and subsequently collecting the black, acetylene blacks, such as are made by explosively decomposing or combusting acetylene in a closed chamber with an insufficiency of oxygen for complete combustion or explosive decomposition of the acetylene, or light lamp blacks. As particular channel blacks or acetylene blacks or light lamp blacks there may be used, for example, those blacks to be obtained commercially under the trade names Shawinigan black, Kosmos T, Kosmos F4, Micronex and Magecol.

As solid ethylene polymers it is preferred to use those polymers with molecular weights between 10,000 and 50,000.

As volatile organic solvents which may be used for one feature of the invention there may be mentioned, for example, aromatic hydrocarbons such as benzene, toluene or xylene, aliphatic hydrocarbons such as petroleum ether, or highly halogenated hydrocarbons such as trichloroethylene.

The invention is illustrated but not limited by the following examples in which the parts are expressed by weight.

*Example 1*

100 parts of ethylene polymer (molecular weight 15,000 and softening point 110°–120° C.) were heated to a temperature of 110–120° C. on a two-roll rubber mill and 50 parts of the carbon black obtained commercially under the trade name of Kosmos T were added. The mixture was milled for 10 minutes and the resulting composition removed from the mill and allowed to cool.

The composition was harder than the uncompounded ethylene polymer, had a tensile strength at break of 103 kg. per cm$^2$. and an electrical conductivity of about $2 \times 10^6$ ohms$^{-1}$ per cm.$^3$, whereas the uncompounded polymer had a tensile strength at break of 81 kg. per cm.$^2$ and an electrical conductivity of about $1 \times 10^{17}$ ohms$^{-1}$ per cm.$^3$.

*Example 2*

A composition was prepared as described in Example 1 from 100 parts of ethylene polymer (molecular weight 15,000 and softening point 110–120° C.) and 30 parts of the carbon black obtained commercially under the trade name of Shawinigan Black.

The composition was harder than the uncompounded polymer and had a tensile strength at break of 125 kg. per cm.$^2$, whereas the uncompounded polymer had a tensile strength at break of 81 kg. per cm.$^2$.

A similar composition containing 50 parts of Shawinigan Black had an electrical conductivity of about $1 \times 10^4$ ohms$^{-1}$ per cm.$^3$.

*Example 3*

A composition was prepared as described in Example 1 from 100 parts of ethylene polymer (molecular weight 15,000 and softening point 110–120° C.) and 40 parts of the carbon black obtained under the trade name of Kosmos F4.

The composition was harder than the uncompounded polymer and had a tensile strength at break of 118 kg. per cm.$^2$, whereas the uncompounded polymer had a tensile strength at break of 81 kg. per cm.$^2$.

A similar composition containing 50 parts of Kosmos F4 had an electrical conductivity of about $3 \times 10^5$ ohms$^{-1}$ per cm.$^3$.

I claim:

1. A solid composition of matter which comprises an intimate mixture of a high molecular weight polymer of ethylene and carbon black in proportion by weight of about 25 to 60 parts of carbon black for 100 parts of said polymer, and which is characterized by substantially greater tensile strength, hardness and electrical conductivity than said ethylene polymer, said polymer being selected from one of the groups consisting of (a) the solid polymer obtained by heating above 500 atmospheres at a temperature of from 100° C. to 400° C. a composition comprising ethylene as an essential component, and (b) the solid halogenated derivative of the polymer obtained by polymerizing ethylene at said temperature and pressure, said carbon black having a particle size not exceeding 100 millimicrons and being one of the group of carbon blacks consisting of acetylene blacks, channel blacks, and lamp blacks.

2. The composition of matter set forth in claim 1 in which the polymer in said mixture is a polymer of ethylene which is a solid at normal temperatures, corresponds in composition substantially to $(CH_2)_x$, and by X-ray diffraction analysis shows a crystalline structure.

BERNARD JAMES HABGOOD.